(12) United States Patent  
Nolan (10) Patent No.: US 7,314,675 B1  
(45) Date of Patent: Jan. 1, 2008

(54) MAGNETIC MEDIA WITH HIGH MS MAGNETIC LAYER

(75) Inventor: Thomas Patrick Nolan, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 241 days.

(21) Appl. No.: 10/766,918

(22) Filed: Jan. 30, 2004

Related U.S. Application Data (60) Provisional application No. 60/509,039, filed on Jul. 28, 2003, provisional application No. 60/444,116, filed on Jan. 30, 2003.

(51) Int. Cl.  
G11B 5/65 (2006.01)

(52) U.S. Cl. .................................... 428/836.1

(58) Field of Classification Search .............. 428/829  
See application file for complete search history.

(56) References Cited

U.S. PATENT DOCUMENTS

| | | | |
|---|---|---|---|
| 4,652,499 A | 3/1987 | Howard | |
| 4,654,276 A | 3/1987 | Ahlert et al. | |
| 5,051,288 A | 9/1991 | Ahlert et al. | |
| 5,066,552 A | 11/1991 | Howard et al. | |
| 5,227,212 A | 7/1993 | Ahlert et al. | |
| 5,239,534 A | 8/1993 | Matsumoto | |
| 5,652,054 A * | 7/1997 | Kikitsu et al. | 428/328 |
| 5,658,659 A * | 8/1997 | Chen et al. | 428/332 |
| 5,665,468 A | 9/1997 | Sekiya et al. | |
| 5,744,256 A | 4/1998 | Goda et al. | |
| 5,849,386 A | 12/1998 | Lal et al. | |
| 6,007,623 A | 12/1999 | Thiele et al. | |
| 6,042,939 A | 3/2000 | Takahashi | |
| 6,086,974 A | 7/2000 | Thiele et al. | |
| 6,174,597 B1 * | 1/2001 | Yusu et al. | 428/332 |
| 6,221,219 B1 | 4/2001 | Hashimoto et al. | |
| 6,440,589 B1 * | 8/2002 | Fullerton et al. | 428/826 |
| 6,472,047 B1 * | 10/2002 | Kirino et al. | 428/141 |
| 6,602,620 B1 * | 8/2003 | Kikitsu et al. | 428/842.2 |
| 6,699,600 B2 * | 3/2004 | Shimizu et al. | 428/828 |
| 6,773,745 B2 * | 8/2004 | Arisaka et al. | 427/130 |
| 2002/0080520 A1 | 6/2002 | Futamoto et al. | |
| 2002/0095767 A1 * | 7/2002 | Takizawa et al. | 29/603.13 |
| 2003/0064249 A1 | 4/2003 | Uwazumi et al. | |
| 2003/0215675 A1 * | 11/2003 | Inaba et al. | 428/694 TP |
| 2004/0202843 A1 * | 10/2004 | Moriwaki et al. | 428/195.1 |

OTHER PUBLICATIONS

Derwent Abstract Translation of US Patent App 2003-0215675 A1 (Derwent Acc No. 2002-427014).*

* cited by examiner

*Primary Examiner*—Kevin M. Bernatz  
(74) *Attorney, Agent, or Firm*—Darby & Darby P.C.

(57) ABSTRACT

Magnetic recording media having a magnetic layer, wherein the magnetic layer comprises a continuous matrix material and a separate portion that is different from the matrix is disclosed. The matrix comprises a non-ferromagnetic material that is non-ferromagnetic in a bulk state. The separate portion comprises a ferromagnetic material and comprises substantially none of at least one component of the non-ferromagnetic material. One embodiment is a dual magnetic layer recording media including a lower magnetization (Ms), exchange decoupled magnetic bottom layer; and a high Ms, high magnetic anisotropy (Ku), magnetic top layer having exchange decoupled grains. This media enables reduced total magnetic layer thickness and higher signal, while maintaining high Ku and low media noise.

14 Claims, 4 Drawing Sheets

Co-continuous region

Discrete region

Figure 1 (Prior art).

Protective overcoat 23

Magnetic layer 22

Underlayer 21

Substrate 20

Underlayer 21'

Magnetic layer 22'

Protective overcoat 23'

MAGNETIC MEDIA WITH HIGH MS MAGNETIC LAYER

RELATED APPLICATIONS

This application claims benefit from Provisional Application Ser. No. 60/509,039, requested for conversion into a provisional application on Jul. 28, 2003, from application Ser. No. 10/611,644, filed Jul. 2, 2003, claiming benefit from Provisional Application Ser. No. 60/444,116, filed Jan. 30, 2003, the entire disclosures of the above mentioned applications are hereby incorporated herein by reference.

FIELD OF INVENTION

This invention relates to magnetic recording media, such as thin film magnetic recording disks, and to a method of manufacturing the media. The invention has particular applicability to high areal density magnetic recording media having very low medium noise.

BACKGROUND

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

Figure 1:
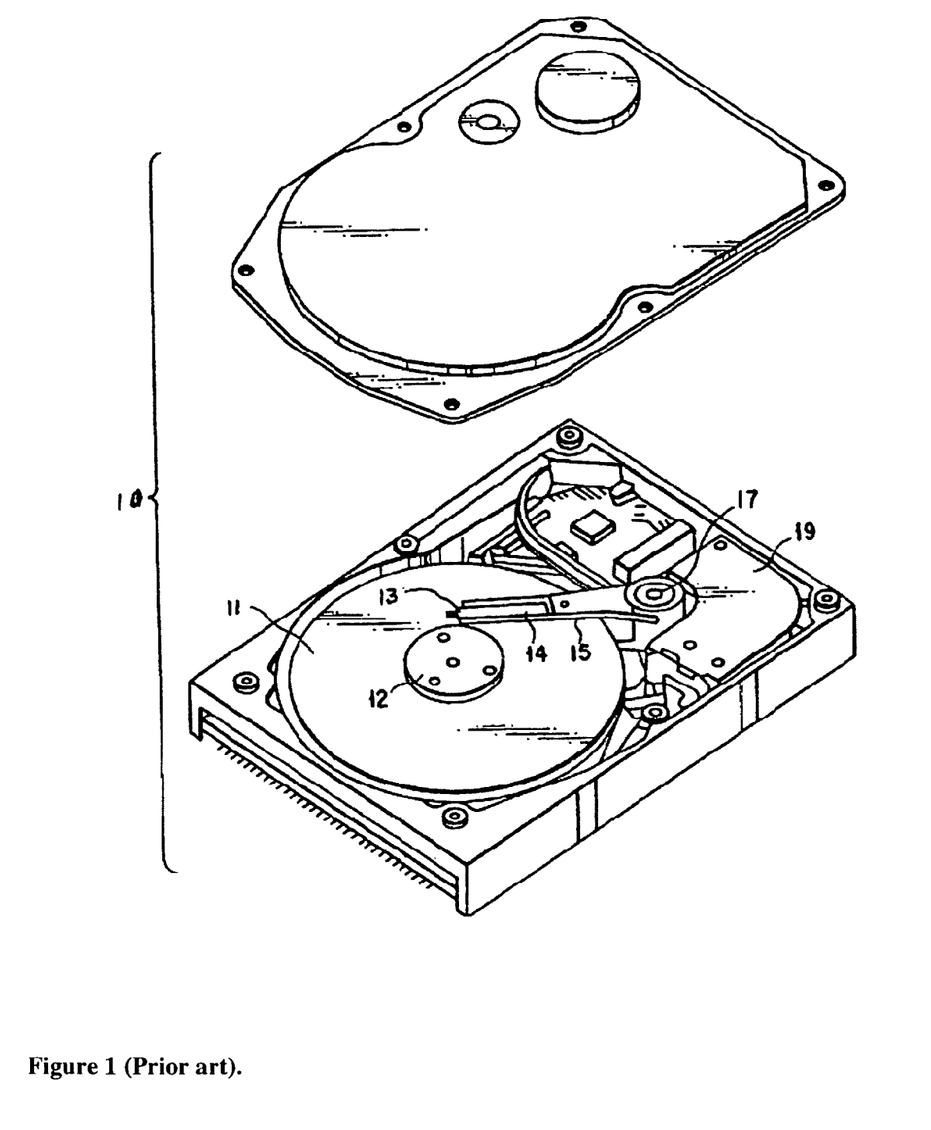
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into near-contact (<1 micro-inch separation) with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

Figure 2:
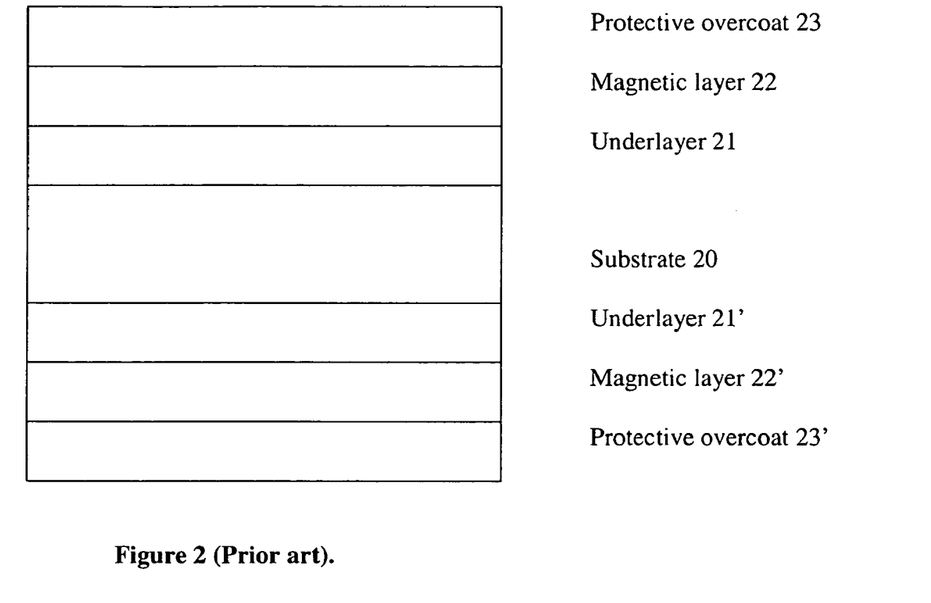
FIG. 2 is a schematic representation of the film structure in accordance with a magnetic recording medium of the prior art.

FIG. 2 shows a cross sectional view of a longitudinal recording disk medium. A longitudinal recording medium typically comprises a non-magnetic substrate 20 having sequentially deposited on each side thereof; an underlayer 21, 21', such as chromium (Cr) or a Cr-containing alloy; a magnetic layer 22, 22', typically comprising a cobalt (Co)-containing alloy; and a protective overcoat 23, 23', typically containing carbon. General practices also comprise bonding a lubricant topcoat (not shown) to the protective overcoat. Underlayer 21, 21', magnetic layer 22, 22', and protective overcoat 23, 23', are typically deposited by sputtering techniques. The Co-containing alloy magnetic layer deposited by sputtering techniques normally comprises polycrystallites epitaxially grown on the polycrystalline Cr or Cr-containing underlayer.

A recording disk medium is prepared by depositing multiple layers of films to make a composite film. In sequential order, the multiple layers typically comprise a non-magnetic substrate, one or more underlayers, one or more magnetic layers, and a protective carbon layer.

Methods for manufacturing a longitudinal magnetic recording medium generally include a polycrystalline epitaxially grown cobalt-chromium (CoCr) alloy magnetic layer deposited on a chromium or chromium-alloy underlayer. Manufacturing longitudinal media with a glass, glass-ceramic, Al or Al-NiP substrate may also comprise applying a seed layer between the substrate and underlayer. A seed layer seeds the nucleation of a particular crystallographic texture of the underlayer. A seed layer is the first deposited layer on the non-magnetic substrate. The role of this layer is to texture (align) the crystallographic orientation of the subsequent Cr-containing underlayer.

Conventionally, the seed layer, underlayer, and magnetic layer are sequentially sputter deposited on the substrate in an inert gas atmosphere, such as an atmosphere of argon. A carbon overcoat is typically deposited in argon with nitrogen, hydrogen or ethylene. Lubricant topcoats are typically less than 20 Å thick.

A substrate material conventionally employed in producing magnetic recording rigid disks comprises an aluminum-magnesium (Al-Mg) alloy. Such Al-Mg alloys are typically electrolessly plated with a layer of NiP at a thickness of about 10 microns to increase the hardness of the substrates, thereby providing a suitable surface for polishing to provide the requisite surface roughness or texture.

Other substrate materials such as glass, glass-ceramic material that comprises a mixture of amorphous and crystalline materials, and ceramic materials have been employed. Glass-ceramic materials do not normally exhibit a crystalline surface. Glasses and glass-ceramics generally exhibit high resistance to shocks.

Longitudinal magnetic recording media having Cr<200> and Co<11.0> crystallographic preferred growth orientations (hereafter orientations) are usually referred as bi-crystal media, and are commonly used in the industry. Here, Cr<200> refers to a body centered cubic (bcc) structured Cr-containing alloy underlayer or a B2-structured underlayer, either having a <200> preferred growth orientation. Typical bi-crystal media comprise Cr-containing alloy underlayers and Co-containing alloy magnetic layers. Uni-crystal media, which have a Co<10.0> preferred orientation; and randomly oriented media have also been used. Perpendicular magnetic recording media having Co<0002> preferred orientation are also being used. All of these media types typically have at least one small grain, hcp Co-containing alloy magnetic layer with low exchange coupling.

The increasing demands for higher areal recording density impose increasingly greater demands on thin film magnetic recording media in terms of coercivity (Hc); remanent coercivity (Hr); magnetic remanance (Mr), which is the magnetic moment per unit volume of ferromagnetic material; coercivity squareness (S*); signal-to-medium noise ratio (SMNR); track recording performance and thermal stability. These parameters are important to the recording performance and depend primarily on the microstructure of the materials of the media. For example, decreasing the grain size or reducing exchange coupling between grains, can increase SMNR, but it has been observed that the thermal stability of the media often decreases.

As the storage density of magnetic recording disks has increased, the product of Mr and the magnetic layer thickness (t) has decreased and Hr of the magnetic layer has increased. This has led to a decrease in the ratio Mrt/Hr. To achieve a reduction in Mrt, the thickness t of the magnetic layer has been reduced, but only to a limit because the magnetization in the layer becomes susceptible to thermal decay.

Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Longitudinal magnetic recording media containing cobalt (Co) or Co alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (hcp) with uniaxial crystalline anisotropy and a magnetization easy direction along the c-axis that lies in the plane of the film. The better the in-plane c-axis crystallographic texture, the more suitable is the Co alloy thin film for use in longitudinal recording to achieve high remanance and coercive force. For very small grain sizes, coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains, thereby decreasing intergranular exchange coupling. This type of microstructural and crystallographic control is typically attempted by manipulating the deposition process, and properly using underlayers and seedlayers.

It is recognized that the magnetic properties, such as Hcr, Mr, S and SMNR, which are critical to the performance of a magnetic alloy film, depend primarily upon the microstructure of the magnetic layer, which, in turn, is influenced by the underlying layers, such as the underlayer. It is also recognized that underlayers having a fine grain structure are highly desirable, particularly for growing fine grains of hcp Co alloys deposited thereon.

For high signal to noise ratio (SNR) magnetic recording media, it is desirable to have a high signal in a very thin film. Higher signal can be achieved by increasing the saturation magnetization (Ms) of the material at the top of the magnetic layer, and correspondingly increasing the fringing magnetic field that provides signal. Prior art magnetic recording systems generally employ media including a magnetic layer alloy including Co and Cr, and other elements often including Pt, and B. These magnetic layer systems generally require 10-25% Cr, and often use 5-15% B in order to isolate the magnetic grains in the magnetic layer and reduce noise. Unfortunately, some of the Cr and B remains in the magnetic grains, reducing Ms to below 500 emu/cc, and correspondingly reducing the signal output of the magnetic layer. Ms can be further degraded by interaction with the protective overcoat. To compensate, thicker magnetic layers are required in order to provide sufficient signal. Addition of Cr and B to the magnetic layer also generally reduces the magnetic anisotropy, Ku, requiring thicker films for thermal stability.

One prior art solution is to deposit a high Ms top layer of pure Co (Ms~1700 emu/cc) upon the CoCrPtB magnetic layer, to significantly increase signal. Unfortunately, increasing top layer thickness rapidly increases exchange coupling, with a corresponding increase in media noise.

There exists a continuing need for high areal density longitudinal magnetic recording media exhibiting high Hcr and high SMNR while overcoming the deficiencies of the prior art solutions.

SUMMARY OF THE INVENTION

The invention relates to a recording medium and method of manufacturing the medium. The media comprises at least two magnetic layers including a lower Ms, exchange decoupled second magnetic layer; and a high Ms, high Ku, first magnetic layer (generally the top layer) having sufficiently exchange decoupled grains so that the combined magnetic layers have low total exchange coupling. This media enables reduced total magnetic layer thickness and higher signal, while maintaining high Ku and low media noise.

One embodiment is a magnetic recording medium, comprising a substrate and a first magnetic layer, wherein the first magnetic layer comprises (a) a continuous matrix comprising at least one or more components and (b) a portion that is different from the matrix. The matrix comprises a non-ferromagnetic material that is non-ferromagnetic in a bulk state, and the portion comprises a ferromagnetic material and comprises substantially none of the at least one or more components. The medium could further comprise a second magnetic layer between the substrate and the first magnetic layer. Preferably, the matrix comprises Cr and the portion comprises less than 5 atomic percent Cr. More preferably, the matrix comprises at least 15 atomic percent Cr. In one variation, the first magnetic layer has Ms >400 emu/cc and Hc >3,000 Oe. More preferably, a difference in Ms of the first and second magnetic layers is greater than 100 emu/cc. Generally, the portion is a discrete particulate region comprising particles or a co-continuous region and preferably the portion is particulate with substantially no magnetic exchange coupling between the particles, which preferably have a mean average particle size of less than 15 nm. In one embodiment, a difference in Ms of the first magnetic layer and of another layer is greater than 100 emul/cc, wherein the another layer has composition similar to the first magnetic layer except the particles of the another layer contain an average concentration of Cr of greater than 5 atomic percent.

Another embodiment is a method of manufacturing a magnetic recording medium comprising obtaining a substrate and preparing a first magnetic layer on the substrate, wherein the first magnetic layer comprises (a) a continuous matrix comprising at least one or more components and (b) a portion that is different from the matrix. The matrix comprises a non-ferromagnetic material that is non-ferromagnetic in a bulk state, and the portion comprises a ferromagnetic material and comprises substantially none of the at least one or more components. The method could further comprise depositing a second magnetic layer. Preferably, the preparing a first magnetic layer comprises depositing a magnetic layer and depositing a non-ferromagnetic material-containing layer. Also, preferably the preparing a first magnetic layer further comprises annealing the magnetic layer and the non-ferromagnetic material-containing layer. The magnetic layer and the non-ferromagnetic material-containing layer could be about 5-25 Å and 1-10 Å thick, respectively. Preferably, annealing forms matrix material between adjacent particles of the ferromagnetic particles such that the ferromagnetic particles are separated by less than 5 nm. Preferably, the magnetic layer and the non-ferromagnetic material-containing layer are a Co-containing material and a Cr-containing material, respectively. More preferably, the magnetic layer and the non-ferromagnetic material-containing layer are a CoPt-containing material and a Cr-containing material, respectively. In one variation, the annealing is at a temperature of 200-600° C. Preferably, the portion comprises less than 5 atomic percent Cr and greater than 70 atomic percent Co.

Another embodiment is a method of manufacturing a recording medium comprising depositing a second magnetic layer comprising grains of a ferromagnetic material separated by regions of a non-ferromagnetic material, depositing an intermediate layer on the second magnetic layer, depositing a top layer comprising a top layer material on the intermediate layer, annealing the intermediate layer and the top layer to cause migration of at least some of the top layer material into the intermediate layer and transforming the intermediate layer into a first magnetic layer containing co-continuous or discrete regions of magnetic material including substantially no top layer material and a matrix including top layer material. Preferably, the intermediate layer has a substantially similar composition as that of the first magnetic layer but contains substantially no Cr or B, and the top layer material comprises Cr or a Cr-containing alloy. Preferably, ferromagnetic portions of the first magnetic layer contain substantially no non-ferromagnetic material from the second magnetic layer or the top layer.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

In this application, the word "containing" means that the layer comprises the elements or compounds before the word "containing" but the layer could still include other elements and compounds. Also, in this application, E-containing alloy and E alloy mean the same, where E is any element.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I-III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for magnetic recording systems exhibiting high areal recording density, high thermal stability and high SMNR. This invention achieves such technological advantages by using a magnetic layer, comprising a continuous matrix material and a discontinuous or discrete material that is different from the matrix. The matrix comprises a non-ferromagnetic material that is non-ferromagnetic in a bulk state. The bulk state of a material is the state when the material is in a large enough volume so that surfaces and interfaces do not significantly affect material properties. The discontinuous or discrete material comprises a ferromagnetic material and comprises substantially none of at least one element of the non-ferromagnetic material.

Figure 3:
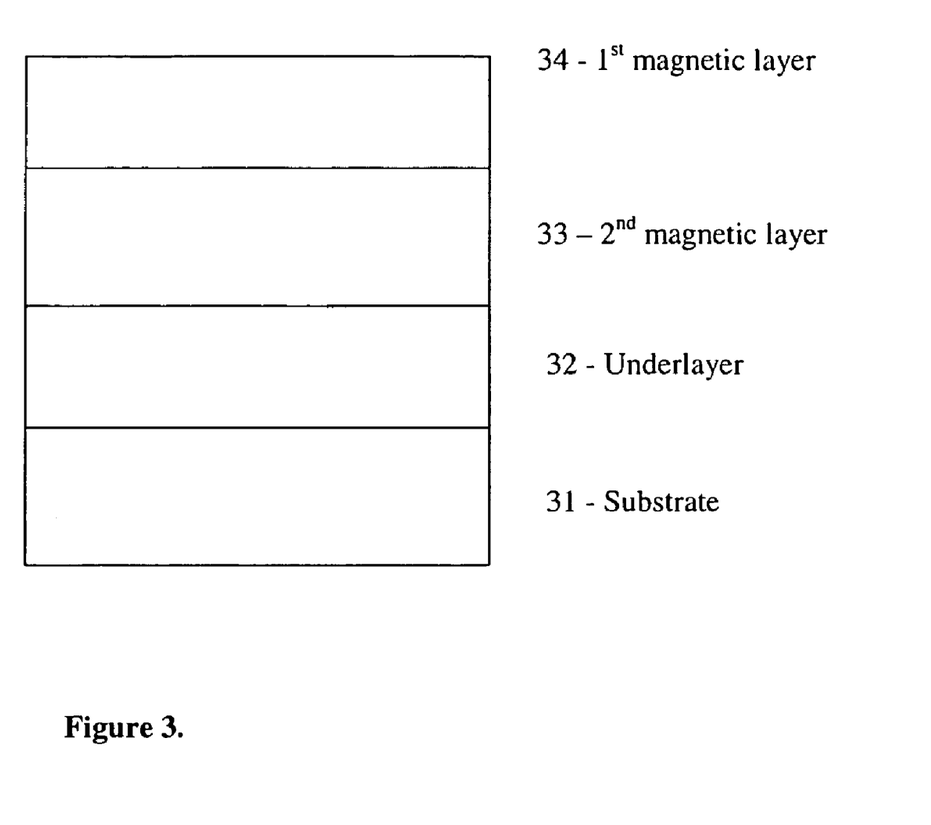
FIG. 3 shows an embodiment of the film structure according to the invention.

FIG. 3 shows some embodiments of the film structure according to the current invention for longitudinal recording. The underlayer 32 is optional and is deposited on a substrate 31 preferably, a NiP-containing alloy plated or glass substrate. In one embodiment it has a <200> crystallographic orientation. A Co-containing alloy-containing $2^{nd}$ magnetic layer 33 is epitaxially grown on the Cr-containing alloy underlayer and has a <11.0> preferred orientation. In an alternative embodiment, other hcp materials (e.g. a Ru-containing alloy and another Co-containing alloy) are deposited between the underlayer 32 and the $2^{nd}$ magnetic layer 33. A Co-containing or Co-containing alloy-containing $1^{st}$ magnetic layer is grown on the $2^{nd}$ magnetic layer. In an alternative embodiment, the $2^{nd}$ magnetic layer resides between the substrate and the $1^{st}$ magnetic layer. A carbon overcoat and a lubricant layer (not shown) are deposited on the magnetic layer 33. The $1^{st}$ magnetic layer 34 contains a non-ferromagnetic matrix in a continuous or discrete region and magnetic domains in a discrete region.

Figure 4:
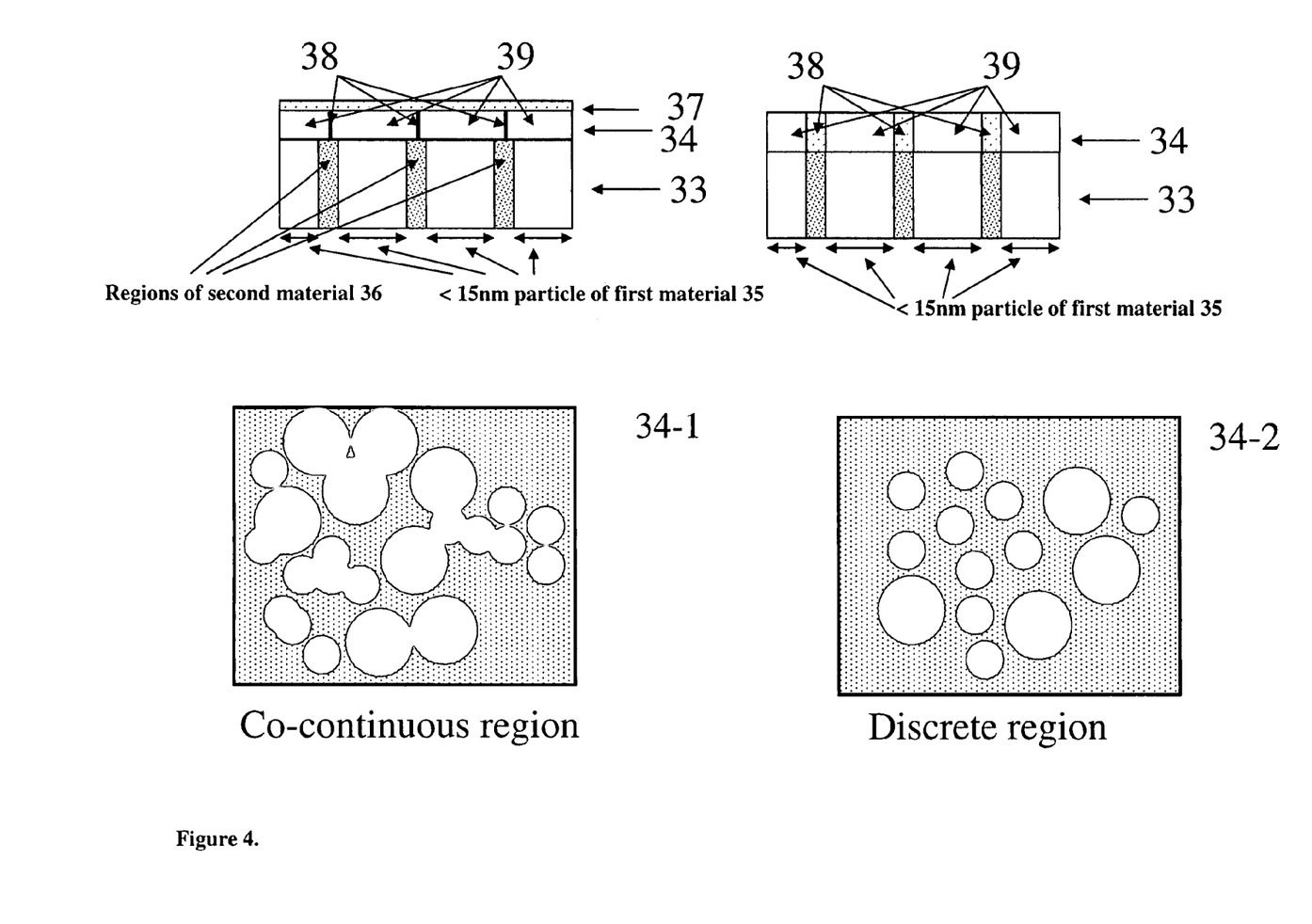
FIG. 4 shows an embodiment of structures developed during the manufacturing of the film structure according to the invention.

FIG. 4 shows typical steps for and the structures resulting during and in the formation of the $1^{st}$ magnetic layer of this invention. The top left figure shows a magnetic layer 33 containing grains of the first material (35), which would be a ferromagnetic material, separated by regions of second material (36), which would be a non-ferromagnetic material. A magnetic layer 34 having substantially similar composition as that of the magnetic layer 33 but containing substantially no Cr or B is deposited on the magnetic layer 33. Layer 37 containing Cr or a Cr-containing alloy (e.g., CrMn) is deposited on layer 34. The stacked layer structure of layers 33, 34 and 37 is then annealed. Annealing results in the migration of the second material 36 into the magnetic layer 34 without substantially causing the migration of any material from layer 33 into the magnetic layer 34 as shown in the top right figure. After annealing, the magnetic layer 34 contains co-continuous or discrete regions of top layer material 37 but contains substantially no second material 36. Preferably, annealing results in the migration of material from at least one of the second material 36 and layer 37 into the grain boundaries 38 of magnetic layer 34 without substantially causing the migration of any material from layer 33 or layer 37 into the grains 39 of magnetic layer 34, as shown in the top right figure. After annealing, the magnetic layer 34 contains co-continuous or discrete regions 39 of ferromagnetic material including substantially no material from layer 34 and substantially no material from layer 37. After annealing, the magnetic layer 34 further contains regions 38 of non-ferromagnetic material including material from at least one of layer 34 and layer 37. Schematic plan-views of examples of the co-continuous and discrete regions (34-1 and 34-2) are shown in the bottom figures, where the gray regions represent ferromagnetic material 39 and the white dotted region represents non-ferromagnetic matrix material 38.

This invention is also equally applicable to randomly oriented, perpendicular, or tilted magnetic recording. In another embodiment, underlayer 32 has a <0002> crystallographic orientation. A Co-alloy-containing $2^{nd}$ magnetic layer 33 is epitaxially grown on the underlayer and has a <0002> preferred orientation. A Co-containing or Co-containing alloy-containing $1^{st}$ magnetic layer is grown on the $2^{nd}$ magnetic layer. In yet other embodiments the c-axis of the crystals in the magnetic layer is either random or tilted at an angle between that for longitudinal and perpendicular recording.

The Co-containing magnetic layer ($1^{st}$ or $2^{nd}$) can comprise any Co-based alloy further including one or more elements selected from Pt, Ta, Nb, B, O, and Cr, though the layer preferably does not have Cr. The magnetic layer can be a single magnetic layer or dual magnetic layers immediately adjacent to each other.

In a variation, there could further be seedlayer(s) of about 1.0 nm to about 160 nm thickness below this underlayer to nucleate growth of the underlayer in a desired crystallographic orientation upon an Al-containing alloy, glass or other substrate.

The carbon overcoat could be further coated with a lubricant layer generally 1 nm to 3 nm thick. The lubricant is preferably a fluorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include Al-containing alloy, glass, glass-ceramic, plastic/polymer material, ceramic, glass-polymer or composite materials.

Desirably, the lattice constant and the crystal plane of the seedlayer(s), if used, should closely match that of the seed layer. Similarly, lattice matching between other layers, except with carbon overcoat, is also desirable. As a consequence of lattice and crystalline plane matching, the magnetic layer, in turn, will grow in a close-packed hexagonal structure with Co{11.0} crystallographic planes predominantly parallel to the film plane, and the magnetic easy axis, c-axis, lying predominantly in the film plane.

In a preferred embodiment, the thickness of the optional seed layer could be about 10 Å to about 1600 Å. The thickness of this varying underlayer could be about 10 Å to about 500 Å, preferably between about 20 Å and about 100 Å, and most preferably between about 25 Å and about 50 Å. The thickness of the first magnetic layer could be about 5 Å to about 100 Å, preferably between about 15 Å and about 50 Å. In one embodiment, the thickness of the first magnetic layer is about 30 Å. The thickness of the second magnetic layer could be about 60 Å to about 300 Å, preferably between about 80 Å and about 200 Å. The thickness of the intermediate layer between the underlayer and the Co-containing magnetic layer, if used, could be about 10 Å to about 300 Å. The thickness of the protective layer could be about 10 Å to about 100 Å, preferably less than about 40 Å. The protective layer could be a carbon-containing layer, and may in some embodiments be made of hydrogenated carbon, nitrogenated carbon, hybrid carbon, or a combination of them.

The magnetic recording medium has a remanent coercivity of about 3,000 to about 10,000 Oersted. In a preferred embodiment, the coercivity is about 3500 to about 7000 Oersted, and Mrt is about 0.25 to about 1 memu/cm².

Note that the optimal values of layer thickness and magnetic properties could be different for longitudinal and perpendicular recording embodiments of this invention.

EXAMPLES

The examples relate to a method and apparatus for a magnetic recording media with a magnetic top layer having high Ms, high Ku, and exchange decoupled grains, thereby enabling reduced total magnetic layer thickness and higher signal, while maintaining high Ku and low noise. All samples described in this disclosure could be fabricated by sputtering such as DC magnetron or rf sputtering, although alternative deposition methods such as CVD, ion beam, cathodic arc, and evaporation may also be employed for some layers.

The steps for manufacturing the media are: (1) Depositing an orienting underlayer(s) on a substrate. (2) Depositing a second magnetic layer, typically a Co-containing alloy magnetic layer. Common alloying elements include Cr, Pt, Ta, Ti, Ni, Si, O, as well as others. (3) Forming a first magnetic layer, typically having Co and Pt containing grains in a non-ferromagnetic continuous matrix. This formation of the first magnetic layer is done by first depositing a CoPt layer, then depositing a very thin CrX grain isolation layer (where X represents zero or more alloying elements), and finally annealing the layers to cause the CrX to diffuse into the CoPt layer thereby forming a continuous matrix of CoCrPtX and a discrete or co-continuous region of a CoPt-containing material including little or substantially no Cr. (4) Depositing a protective overcoat.

Longitudinal Recording Media: For example, the longitudinal recording embodiment could have a coercivity of about 4500 Oe, Mrt of about 0.3 memu/cm², a CrX/Co-containing alloy with optional anti-ferromagnetic coupling structure such as CrX/Co-alloy/RuX/Co-alloy.

Step 1: Deposit seedlayers and/or underlayers.(not a sentence) For longitudinal media, preferred embodiments often include Cr-containing alloy underlayers, and may also include nonmagnetic hcp materials oriented with <11.0> or <10.0> growth direction.

Step 2: Deposit a second magnetic layer, which could be more than one magnetic layer and could include an hcp CoCrPtB alloy oriented with <11.0> or <10.0> growth direction. The magnetic layers commonly include 10-25% Cr, and often use 5-15% B. The magnetic layers may also include Ta, Ti, Si, O, and other alloying elements. The magnetic layers could include 50-70 atomic% cobalt, and have Ms=200-500 emu/cc. Magnetic layer thickness for common 0.4 emu/cm² media is often 100-200 Å. Further small increases in deposited magnetic layer thickness may be required to compensate for material losing magnetization owing to intermixing with the underlayer or overcoat. In a preferred embodiment of the invention, step 2 magnetic layer thickness is reduced to ~25-75 Å so as to decrease Mrt by ~0.05 to 0.15 memu/cm².

Step 3: Deposit a thin, high Ms Co-containing alloy magnetic layer. In some embodiments, this layer includes Co and Pt. In some preferred embodiments, Co concentration is above 70 atomic %, and Ms is above 500 emu/cc. Cr and B concentrations are generally below 5%. In a preferred embodiment, magnetic top layer thickness is ~5-20 Å, with Mrt 0.05 to 0.15 memu/cm².

Step 4 (optional): Deposit a thin grain isolation layer. In a variation, this layer includes a Cr, CrMn, or other Cr-containing alloy having high surface and grain boundary diffusivity upon Co-containing alloys. In some preferred embodiments,1-10 Å of Cr-containing alloy is sputter deposited at a substrate temperature above 200° C. to induce Cr segregation to grain boundaries. In some of these embodiments, a heating step is performed prior to the Cr-containing alloy layer deposition. In other embodiments, a separate grain isolation layer is not required, and intermixing between the top magnetic layer and the carbon overcoat will provide necessary reduction of exchange coupling.

Step 5 (optional): In a variation, a heating step is performed after deposition of the Cr-containing alloy layer.

This step may be performed prior to deposition of a protective overcoat, or after the thin-film deposition at step 6 is completed.

Step 6 (optional): Deposit a protective overcoat, typically comprising an amorphous C-containing alloy structure and a polymer lubricant. The Cr- containing alloy layer acts to isolate the magnetic materials from the C overcoat.

Perpendicular Recording Media: The perpendicular recording embodiment could have a coercivity of about 5500 Oe, Mrt of about 0.6 memu/cm$^2$, a soft magnetic underlayer of a thickness of about 100 nm, a seedlayer, an underlayer having a <0002> orientation, and a Co-alloy magnetic layer.

Step 1: Orienting seed layers for perpendicular media preferred embodiments often include amorphous seed layers and hcp underlayers oriented with <0002> growth direction.

Step 2: Deposit a magnetic layer, which could be more than one magnetic layer and include an hcp Co-containing alloy oriented with <0002> growth direction. These magnetic layer systems commonly include 5-25% Cr. Magnetic layers may also include Pt, Ti, Ta, Si, O, and other alloying elements. Magnetic layers commonly include 50-70 atomic % cobalt, and have Ms=200-600 emu/cc. Magnetic layer thickness for common 0.5 emu/cm$^2$ media is often 80-200 Å. Further small increases in deposited magnetic layer thickness may be required to compensate for material losing magnetization owing to intermixing with the underlayer or overcoat. In a preferred embodiment of the invention, step 2 magnetic layer thickness is reduced by ~20-60 Å so as to decrease Mrt by 0.05-0.15 memu/cm$^2$.

Step 3: Deposit a thin, high Ms Co-containing alloy magnetic top layer. In some embodiments, this layer includes Co and Pt. In some preferred embodiments, Co concentration is above 70 atomic %, and Ms is above 500 emu/cc. Cr and B concentrations are generally below 5 atomic %. For step 2 magnetic layers including oxygen, magnetic top layer oxygen incorporation is generally also reduced below 5 atomic %. Magnetic top layer thickness is generally ~5-20 Å, with Mrt ~0.05-0.15 memu/cm$^2$.

Step 4 (optional): Deposit a thin grain isolation layer. In some embodiments, this layer includes a Cr, CrMn, or other Cr-conalloy having high surface and grain boundary diffusivity upon Co-conalloys. In some preferred embodiments, 1-10 Å of Cr-conalloy is sputter deposited at a substrate temperature above 200° C. to induce Cr segregation to grain boundaries. In some of these embodiments, a heating step is performed prior to the Cr-containing alloy layer deposition. In other embodiments, a separate grain isolation layer is not required, and intermixing between the top magnetic layer and the carbon overcoat will provide necessary reduction of exchange coupling.

Step 5 (optional): In some embodiments, a heating step is performed after deposition of the Cr-containing alloy layer. This step may be performed prior to deposition of a protective overcoat, or after the thin-film deposition at step 6 is completed.

Step 6 (optional): Deposit a protective overcoat, typically comprising an amorphous C-containing structure and a polymer lubricant. The Cr-containing alloy layer acts to isolate the magnetic materials from the C overcoat.

Determination of the composition of the regions in the magnetic layers could be performed by persons skilled in the art by transmission electron microscopy (TEM), energy dispersive spectroscopy (EDS) or electron energy loss spectroscopy (EELS).

A preferred embodiment is an apparatus for magnetic recording media comprising a substrate; at least one underlayer; at least one magnetic layer comprising cobalt and at least two of platinum, chromium, boron, oxygen, and tantalum; a magnetic top layer comprising cobalt and platinum, and not comprising chromium; a grain isolation layer comprising chromium; and a protective overcoat. The grain isolation layer could further comprise manganese. Optionally, the media is annealed after deposition of the grain isolation layer. The first magnetic layer, generally the top layer, comprises 10-30% Pt. The first magnetic layer has Ms>500 emu/cc. Preferably, the Cr from the grain isolation layer diffuses into the grain boundaries within the first magnetic layer, but not within the grains of the first magnetic layer. In one variation, the grain isolation layer comprises part of a protective overcoat. In one embodiment, the first magnetic layer comprises less than 5% Cr and 10-30% Pt. In yet another embodiment, the first magnetic layer comprises a same or higher Pt concentration as that in the second magnetic layer. The apparatus could be magnetic recording media for a longitudinal recording media or a perpendicular recording media. The media could further comprise at least one underlayer comprising a bcc alloy with a <200> growth orientation. The magnetic recording media could further comprise a soft magnetic underlayer.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. The disclosed numerical ranges, even though a precise range limitation is not stated verbatim in the specification, can be practiced throughout the disclosed numerical ranges. Finally, the entire disclosure of the patents and publications referred in this application are hereby incorporated herein by reference.

The invention claimed is:

1. A magnetic recording medium, comprising a substrate and a first magnetic layer, wherein the first magnetic layer comprises (a) a continuous matrix comprising at least Co and Cr and (b) a ferromagnetic portion that is different from the continuous matrix, the continuous matrix comprises a non-ferromagnetic material, the ferromagnetic portion comprises a ferromagnetic material, and said ferromagnetic portion comprises more than zero and less than 5 atomic percent Cr, wherein the continuous matrix comprises at least 15 atomic percent Cr.

2. The magnetic recording medium of claim 1, further comprising a second magnetic layer between the substrate and the first magnetic layer.

3. The magnetic recording medium of claim 2, wherein the first magnetic layer has Ms >400 emu/cc and Hc >3,000 Oe.

4. The magnetic recording medium of claim 2, wherein a difference in Ms of the first and second magnetic layers is greater than 100 emu/cc.

5. The magnetic recording medium of claim 2, wherein the ferromagnetic portion is a discrete particulate region comprising particles or a co-continuous region.

6. The magnetic recording medium of claim 5, wherein there is no magnetic exchange coupling between the particles.

7. The magnetic recording medium of claim 5, wherein the particles have a mean average particle size of less than 15 nm.

8. The magnetic recording medium of claim 1, wherein the ferromagnetic portion comprises CoPt.

9. The magnetic recording medium of claim 1, wherein the continuous matrix further comprises Pt.

10. A magnetic recording medium comprising a magnetic layer, wherein the magnetic layer comprises (a) a continuous matrix comprising at least Co and Cr and (b) a ferromagnetic portion that is different from the continuous matrix, the ferromagnetic portion comprises more than zero and less than 5 atomic percent Cr, and the continuous matrix comprises at least 15 atomic percent Cr.

11. The magnetic recording medium of claim 10, wherein said magnetic layer has Ms >400 emu/cc and Hc >3,000 Oe.

12. The magnetic recording medium of claim 10, wherein the ferromagnetic portion is a discrete particulate region comprising particles or a co-continuous region.

13. The magnetic recording medium of claim 12, wherein there is no magnetic exchange coupling between the particles.

14. The magnetic recording medium of claim 12, wherein the particles have a mean average particle size of less than 15 nm.

* * * * *